(12) United States Patent
Roberson et al.

(10) Patent No.: US 11,786,068 B2
(45) Date of Patent: Oct. 17, 2023

(54) INFANT FORMULA PREPARATION APPARATUS AND METHOD

(76) Inventors: Danny J. Roberson, Euless, TX (US); Aida Viana, Miami, FL (US); Lidia Viana, Miami, FL (US)

(*) Notice: Subject to any disclaimer, the term of this patent is extended or adjusted under 35 U.S.C. 154(b) by 635 days.

(21) Appl. No.: 12/554,569

(22) Filed: Sep. 4, 2009

(65) Prior Publication Data

US 2010/0068354 A1    Mar. 18, 2010

Related U.S. Application Data

(60) Provisional application No. 61/094,227, filed on Sep. 4, 2008.

(51) Int. Cl.
*A47J 31/40* (2006.01)
*B65D 85/804* (2006.01)

(52) U.S. Cl.
CPC ........ *A47J 31/407* (2013.01); *B65D 85/8043* (2013.01)

(58) Field of Classification Search
CPC ............................ A47J 31/407; B65D 85/8043
USPC ....................................................... 426/115
See application file for complete search history.

(56) References Cited

U.S. PATENT DOCUMENTS

| | | | |
|---|---|---|---|
| 1,910,933 A | 5/1933 | Santurello |
| 2,091,042 A | 8/1937 | Hedges |
| 2,209,430 A | 7/1940 | Turshin |
| 2,215,688 A | 9/1940 | Chamberlain |
| 2,340,932 A | 2/1944 | Chalupa |
| 2,409,512 A | 10/1946 | Mungo |
| 2,529,672 A | 11/1950 | Black |
| 2,784,879 A | 3/1957 | Fischer |
| 2,819,377 A | 1/1958 | Brown |
| 3,143,636 A | 8/1964 | Lupovici |
| 3,200,997 A | 8/1965 | Creswick |
| 3,218,175 A | 11/1965 | Siegel et al. |
| 3,269,606 A | 8/1966 | Armstrong |
| 3,311,266 A | 3/1967 | Ward |
| 3,335,910 A | 8/1967 | Rossi |
| 3,352,460 A | 11/1967 | Herring |
| 3,402,763 A | 9/1968 | Peterson |
| 3,529,726 A | 9/1970 | Keenan |

(Continued)

FOREIGN PATENT DOCUMENTS

| | | |
|---|---|---|
| AU | 7666 | 11/1927 |
| AU | 156340 | 7/1952 |

(Continued)

OTHER PUBLICATIONS

Brewer, Jay. "Tassimo Hot Beverage System from Single Serve Coffee." Aug. 30, 2005. http://www.singleservecoffee.com/archives/002733.php.*

(Continued)

*Primary Examiner* — Katherine D Leblanc

(57) ABSTRACT

An infant formula dispensing apparatus has a receptacle for receiving a sealed pod containing an amount of infant formula powder sufficient for a single feeding of a predetermined size. When the pod is placed in the receptacle, a fixture of the apparatus pierces the pod and forces warm water through the pod. The water mixes with the infant formula powder in the pod and exits the pod through a spout, where it is received in a receptacle, such as a lidless baby bottle.

2 Claims, 8 Drawing Sheets

(56) References Cited

U.S. PATENT DOCUMENTS

| | | |
|---|---|---|
| 3,551,091 A | 12/1970 | Veloz |
| 3,576,426 A | 4/1971 | Sesholtz |
| 3,658,122 A | 4/1972 | Kalyk |
| 3,896,289 A | 7/1975 | Di Renna |
| 3,955,713 A | 5/1976 | Hurley |
| 4,055,279 A | 10/1977 | Lapera et al. |
| 4,116,246 A | 9/1978 | Franzen |
| 4,124,793 A | 11/1978 | Colman |
| 4,133,456 A | 1/1979 | Corini |
| 4,139,125 A | 2/1979 | Arzberger et al. |
| 4,163,471 A | 8/1979 | Leder |
| 4,181,243 A | 1/1980 | Frahm |
| 4,193,506 A * | 3/1980 | Trindle et al. ............... 215/11.6 |
| 4,365,143 A | 12/1982 | Kerber, Jr. |
| 4,491,520 A | 1/1985 | Jaye |
| 4,597,435 A | 7/1986 | Fosco, Jr. |
| 4,614,859 A | 9/1986 | Beckering et al. |
| 4,644,855 A | 2/1987 | Woolman et al. |
| 4,651,862 A | 3/1987 | Greenfield, Jr. |
| 4,762,613 A | 8/1988 | Snowball |
| 4,766,321 A | 8/1988 | Lew et al. |
| 4,791,860 A | 12/1988 | Verheijen |
| 4,818,114 A | 4/1989 | Ghavi |
| 4,857,204 A | 8/1989 | Joklik |
| 4,867,048 A | 9/1989 | Brewer |
| 4,872,317 A | 10/1989 | Reed |
| 4,889,973 A | 12/1989 | Farinacci et al. |
| 4,909,931 A | 3/1990 | Bibi |
| 4,917,005 A | 4/1990 | Knepler |
| 4,971,687 A | 11/1990 | Anderson |
| 4,975,562 A | 12/1990 | Friedman |
| 4,993,593 A | 2/1991 | Fabiano et al. |
| 5,002,226 A | 3/1991 | Nelson |
| 5,027,696 A | 7/1991 | Antonini |
| 5,038,752 A | 8/1991 | Anson |
| 5,057,667 A | 10/1991 | Bell et al. |
| 5,058,195 A | 10/1991 | Knepler |
| 5,063,836 A | 11/1991 | Patel |
| 5,111,969 A | 5/1992 | Knepler |
| 5,125,068 A | 6/1992 | McNair et al. |
| 5,392,694 A | 2/1995 | Muller et al. |
| 5,397,031 A | 3/1995 | Jensen |
| 5,570,816 A | 11/1996 | LaBarbera, Jr. |
| 5,597,482 A | 1/1997 | Melyon |
| 5,671,325 A | 9/1997 | Roberson |
| 5,797,313 A | 8/1998 | Rothley |
| 6,118,933 A | 9/2000 | Roberson |
| 6,173,117 B1 * | 1/2001 | Clubb ............................ 392/442 |
| 6,253,028 B1 | 6/2001 | Roberson |
| 6,358,545 B1 * | 3/2002 | Chandler ............... B65D 33/01 222/129.1 |
| 6,411,777 B2 | 6/2002 | Roberson |
| 6,606,938 B2 | 8/2003 | Taylor |
| 6,607,762 B2 | 8/2003 | Lazaris et al. |
| 6,612,224 B2 * | 9/2003 | Mercier et al. ................. 99/282 |
| 6,655,260 B2 | 12/2003 | Lazaris et al. |
| 6,711,990 B1 | 3/2004 | Harrison |
| 6,766,106 B2 | 7/2004 | Roberson |
| 6,829,431 B1 | 12/2004 | Haven et al. |
| 7,165,488 B2 | 1/2007 | Bragg et al. |
| 7,377,162 B2 | 5/2008 | Lazaris |
| 2004/0025701 A1 * | 2/2004 | Colston ............... A47J 31/3628 99/279 |
| 2005/0178799 A1 | 8/2005 | Cheong |
| 2007/0221066 A1 * | 9/2007 | Sullivan ............... A47J 31/3695 99/279 |
| 2007/0261566 A1 | 11/2007 | Varney et al. |
| 2008/0050490 A1 | 2/2008 | Stalder et al. |
| 2008/0160153 A1 | 7/2008 | Hestekin et al. |

FOREIGN PATENT DOCUMENTS

| | | |
|---|---|---|
| AU | 749977 | 4/1999 |
| CA | 2304772 A1 | 4/1999 |
| CH | 456885 | 7/1968 |
| DE | 2907495 A1 | 9/1980 |
| DE | 3200440 A1 | 7/1983 |
| DE | 3511159 A1 | 10/1986 |
| DE | 9203538 | 7/1993 |
| DE | 4206862 A1 | 9/1993 |
| DE | 29611088 | 1/1997 |
| FR | 2561893 A1 | 10/1985 |
| FR | 2620017 A1 | 3/1989 |
| GB | 1367354 A | 9/1974 |
| GB | 2019813 A | 11/1979 |
| GB | 2143625 A | 2/1985 |
| GB | 2214355 A | 8/1989 |
| GB | 2240465 A | 8/1991 |
| GB | 2346133 A | 8/2000 |
| JP | 8275871 A | 10/1996 |
| JP | 8275880 A | 10/1996 |
| WO | WO-8902239 A1 | 3/1989 |
| WO | WO-9318695 A1 | 9/1993 |
| WO | WO-9603067 A1 | 2/1996 |
| WO | WO-9747224 A1 | 12/1997 |
| WO | WO-9915056 A1 | 4/1999 |
| WO | WO-2006077259 A1 * | 7/2006 ............ A47J 31/407 |

OTHER PUBLICATIONS

International Search Report and Written Opinion dated Oct. 22, 2009 in PCT Application No. PCT/US2009/056094.

"Airway Burns in an Infant following Aspiration of Microwave-heated Tea," Jeffery S. Garland et al; Chest, pp. 621-622; Oct. 1986.

"Playskool Baby Easy Feedin' Nighttime Feeder," J.C. Penney Catalog, p. 597.

"The Biogeochemistry of Lead in the Environment"; Topics in Environmental Health; J.O. Nriagu, p. 243.

"Microwave Heating of Infant Formula: A Dilemma Resolved"; Madeleine Sigman-Grant, PdDRD et al., Pediatrics, vol. 90, No. 3, pp. 412-415; Sep. 1992.

"Risk Factors for Microwave Scald Injuries in Infants"; William C. Sando, M.D. et al; The Journal of Pediatrics, vol. 105, No. 6, pp. 864-867; Jul. 1984.

"Palatal Burn Due to Bottle Warming in a Microwave Oven"; Pediatrics, vol. 82, No. 3, pp. 382-385; Sep. 1988.

"Hazard of Lead in Infant Formula"; Michael Shannon, M.D., M.P.H. et al; New England Journal of Medicine, vol. 326, No. 1, pp. 137-138; Jan. 1992.

"Lead Intoxication in Infancy," Michael W. Shannon, M.D., M.P.H. et al; Pediatrics, vol. 89, No. 1, pp. 87-90; Jan. 1992.

"Microwave Heating of Infant Formula and Breast Milk"; Margaret Nemethy, RN, PNP et al; Journal of Pediatric Health Care, vol. 4, No. 3, pp. 131-135; Jan.-Feb. 1990.

"Burn Injury Related to the Improper Use of a Microwave Oven"; Mark Puczynski, MD et al; Pediatrics, vol. 72, No. 5, pp. 714-715; Nov. 1983.

"Strategic Plan for the Elimination of Childhood Lead Poisoning;" U.S. Dept. of Health and Human Services; pp. 1,4, 5, 8, 33-34 and 43, Feb. 1991.

"Listeriosis—A 'New' Infection Linked to Contaminated Foods", Child Health Alert, Oct. 1988 pp. 1, 3, 4 and 6.

"An Introduction to UV Disinfection", Jesse Rodriquez, reprinted from Water Conditioning and Purification, Aug. 1996.

Sales Brochure: AquaTronic Systems, Inc., "Ultraviolet Advantage".

Sales Brochure: Ideal Horizons, "UV Treatment Systems".
Sales Brochure: Ideal Horizons, "Multistage Series".
Sales Brochure: Ideal Horizons, "SV, SS & SSW Series".
Sales Brochure: Ideal Horizons, "IH / SR Series".
Sales Brochure: Ideal Horizons, "LBR Series".
Sales Brochure: Ideal Horizons, "LCI Series ".
Sales Brochure: Ideal Horizons, "S Series".
Sales Brochure: Ideal Horizons, "R Series".
Sales Brochure: Ideal Horizons, "IH-2L Series".
Sales Brochure: Ideal Horizons, "Ultraviolet Disinfection Plus Filtration".
Sales Brochure: Living Water, "Pure Refreshment and More".

(56) References Cited

OTHER PUBLICATIONS

Notification of Transmittal of the International Search Report or the Declaration, dated Feb. 2, 1999, in PCT Application No. PCT/US98/19749 (3 pages).
Notification of Transmittal of International Preliminary Examination Report, dated Mar. 23, 2000, in PCT Application No. PCT/US98/19749 (8 pages).

* cited by examiner

INFANT FORMULA PREPARATION APPARATUS AND METHOD

CROSS-REFERENCE TO RELATED APPLICATION

This application claims the benefit of U.S. provisional application No. 61/094,227, filed Sep. 4, 2008, which is incorporated herein in its entirety by reference for all purposes.

FIELD

The present disclosure generally relates to preparation of infant formula.

BACKGROUND

U.S. Pat. No. 6,766,106 discloses an apparatus and method for preparing infant formula from powdered formula. Water is dispensed at a temperature substantially in a range around body temperature into an infant bottle containing powdered infant formula for mixing and immediate feeding to an infant, thereby avoiding unnecessary inconvenience to the infant's caregiver associated with typical methods of preparing infant formula for feeding, while also ensuring that the formula has been prepared in a manner that is safe for the infant. The water is filtered and heated to a safe temperature, without boiling, for dispensing on demand. The disclosure of this issued United States patent is incorporated herein in its entirety for all purposes.

SUMMARY

In one exemplary embodiment, an infant formula preparation apparatus comprises a chamber for receiving a pod containing powdered or concentrated infant formula. When the pod is placed in the apparatus, the apparatus forces water at a temperature suitable for safe ingestion by an infant through the pod. Turbulence of the water entering the pod at an entry opening tends to force the powdered or concentrated infant formula out of the pod through an exit opening and encourages mixing. The water and infant formula powder in the pod exit the pod and are received in a receptacle, such as a lidless infant bottle.

In alternative embodiment, at least some of the powder may first fall from the pod under force of gravity, into the bottle, with water being used to sweep away remaining powdered or concentrated formula.

The apparatus preferably opens entry and/or exit openings once it is placed in the apparatus, either automatically or by a user manipulating the apparatus.

It is also preferable that the pod be filled with powdered or condensed infant formula by a manufacturer in an amount sufficient for a single feeding, and then sealed prior to sale and until use by the caregiver preparing formula for feeding to infants.

DRAWINGS

The drawings described herein are for illustration purposes only and are not intended to limit the scope of the present disclosure in any way.

DETAILED DESCRIPTION

Figure 1:
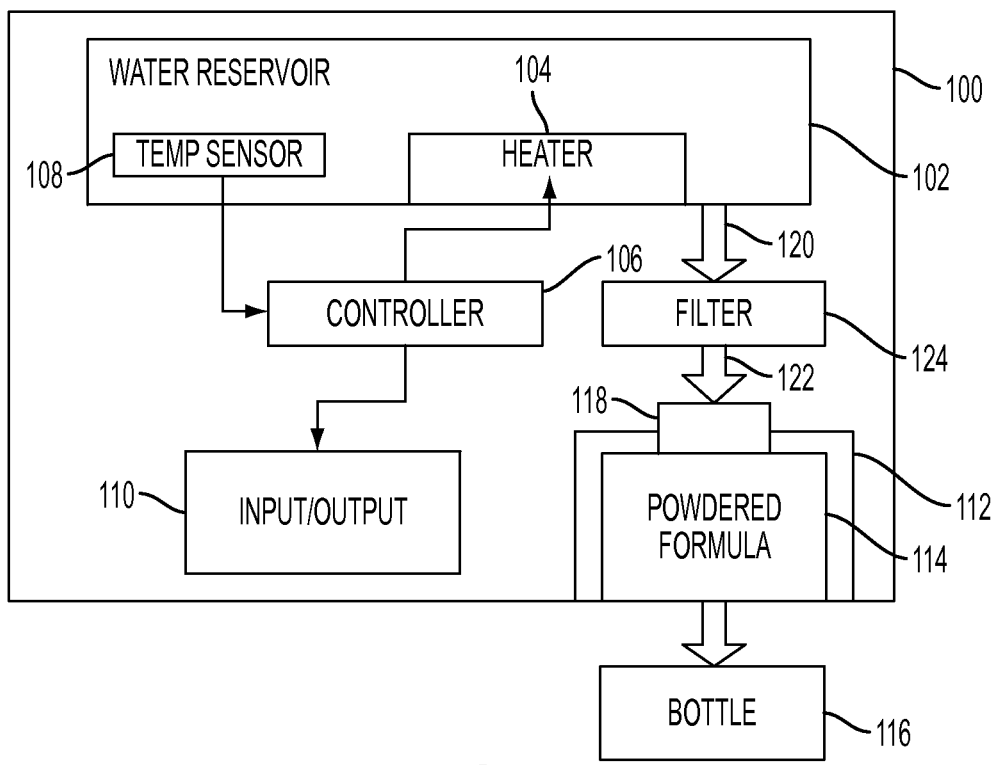
FIG. 1 is a schematic illustration of an infant formula preparation apparatus.

The following description is of exemplary and preferred embodiments. The scope of the invention is defined and limited only by the appended claims. Like reference numerals refer to like elements.

Referring to FIG. 1, apparatus 100 is a schematic representation of an apparatus for preparing infant formula from powder. Preferably, it is a fully-integrated, dedicated apparatus used primarily for preparing infant formula suitable for feeding to an infant from infant formula in a powdered or liquid concentrate form that must be mixed with water prior to use, and which is commercially sold and available to infant caregivers, including parents, family members and infant care service providers.

In a preferred embodiment, as schematically illustrated in FIG. 1, apparatus 100 comprises a water reservoir 102. The water reservoir is used for storing water for use in making infant formula. The water reservoir is sized to hold, preferably, at least 16 fluid ounces of water, which is sufficient for at least four 4-ounce baby feedings or two 8-ounce feedings. The capacity of the reservoir may be larger. However, in order to reduce the risk of growth of microorganisms or contamination by foreign material, the water should not be kept in the reservoir for extended periods of time. Keeping the volume of the reservoir relatively small discourages long-term storage of water.

In the illustrated embodiment of FIG. 1, heater 104 is in thermal communication within water reservoir 102. The heater receives electrical power and converts it to heat. The heater is disposed within the water reservoir or adjacent to the water reservoir in order to transfer heat to the water within the reservoir. If located outside, but adjacent to the reservoir, heat may be transferred through, for example, a thermally wall of the reservoir. Such an arrangement would permit the water reservoir to be removed for refill and cleaning.

During normal operation, all of the water in the reservoir is heated by the heating element to a temperature suitable for ingestion by an infant and thereafter kept at that temperature until turned off or a predetermined cycle expires. The water temperature is preferably kept at a temperature within the range of 70° to 105° F., and is more preferably kept between 92° and 100° F. Generally, it has been found that mixing water with powdered infant formula does not significantly lower the temperature of the resulting liquid formula below that of the water constituent. For most infants, the ideal temperature for feeding is at or about the normal body temperature, which temperature averages at 98.6° F. for most persons. Regardless of the actual temperature, it is preferable for the apparatus to provide water instantaneously at a consistent temperature, within a range of temperatures acceptable for an infant to consume the formula without the risk of overheating or hot spots, so that the water can be mixed with powdered infant formula and fed immediately to the infant.

In order for the water temperature to be kept within this range, preferably within a few degrees of a set point, the heating element is controlled by a controller 106 that is adapted specially to do so. The controller controls the heater by, for example, turning on and off the power delivered to the heater or by controlling the amount and/or direction of current being supplied to the heating element. No particular type of heating element is implied. The controller and heater can be integrated into a single unit. Controller 106 may comprise a thermostat or thermostatic control element that receives as feedback temperature information from temperature sensor 108. More than one temperature sensor can be used, and the sensors can be located within or adjacent to the reservoir as well as in the heating element.

Unlike coffee makers and other types of apparatuses that heat water to boiling or near boiling temperatures, the water for mixing with infant formula must be carefully controlled to ensure that it is not too hot or that the water does not have hot spots within it, which could scald infants. Furthermore, boiling water leads to substantially increased rates of evaporation, that in turn may concentrate lead and other contaminants found in water that are unhealthy for an infant, and therefore, in the preferred embodiments, it is preferable to avoid boiling.

One method for controlling the heating of the water comprises heating the water relatively slowly in order to ensure that the temperature throughout the reservoir is relatively constant and free of hot spots. Slow heating also permits better thermostatic control to avoid overshooting a set point temperature. Measurement of the temperature of the water in the reservoir can be, thus, made more accurately and placement of a temperature sensor is less critical. It may be possible to omit use of the temperature sensor depending on the heating element and the controller used or to integrate the temperature sensor with the heating element. The temperature can be reasonably estimated or known based on the temperature of the heating element and the power being consumed by the heating element.

It is also preferable for a caregiver to be able to set the temperature of the water being dispensed based on preferences of the infant and of the caregiver. Input/output circuits 110 preferably enable a user to set a desired temperature with the controller 106 and to receive from the controller an indication of the set point temperature and, preferably, also an indication of the temperature of the water which can be either the actual temperature, either as measured or estimated, or an indication of whether the temperature is below, within the acceptable range of, or above the set point. Examples of input/output circuits, which can be comprised of multiple sub-circuits, include, by way of example and not limitation, any type of mechanism responsive to, or adapted for manipulation by, a caregiver, such as buttons, switches, rotary knobs, touch sensitive panels and the like, and any type of display.

Formed within apparatus 100 is a compartment or receptacle 112 that is configured to receive a pod 114 comprising a container and infant formula in a powdered or a liquid concentrate form, and to support, alone or in combination with a frame or other support structure, the pod within the apparatus so that it may cooperate with a fitting or other coupling element on the apparatus to form a coupling 118 for passage and delivery of water to the pod 114. Coupling 118 is formed between the apparatus 100 and pod 114 when the pod 114 is fully inserted into receptacle 112 by manually inserting the pod into the receptacle or by the apparatus moving it into the coupling relationship. Coupling 118 may comprise, for example, a coupling element on the apparatus, such as a tube, that fits through an opening in a wall of the pod and extends into the inside of the pod 114. The opening may be preexisting in a wall or portion of the container comprising the pod, with a cover that is punctured or cut by the fitting of the apparatus, or the fitting may form the opening by puncturing, cutting or tearing an opening. Alternately, the pod may comprise an extension that fits within, and preferably seals against, a female coupling member disposed within the apparatus.

Water from water reservoir 102 preferably flows along a path, as represented by arrows 120 and 122, from the reservoir to the coupling 118 through a filter 124. Filter 124 represents one or more filters for filtering microorganisms and small particles that may exist within the water. The filter could be comprised of a series of filters, such as an activated carbon filter and a membrane for filtering smaller particles. Furthermore, the filter may incorporate an ultraviolet lamp for disinfecting the water as it passes through the filter. Disinfecting the water with ultraviolet radiation will kill bacteria and other microorganisms, which may be present in the water. Alternately, an ultraviolet lamp could be placed into the water flow path, separately from the filter, so that water is pumped past during dispensing. An ultra-violet lamp may also be mounted within the reservoir for shining on the water in the reservoir to disinfect bacteria and other microorganisms.

Figure 2:
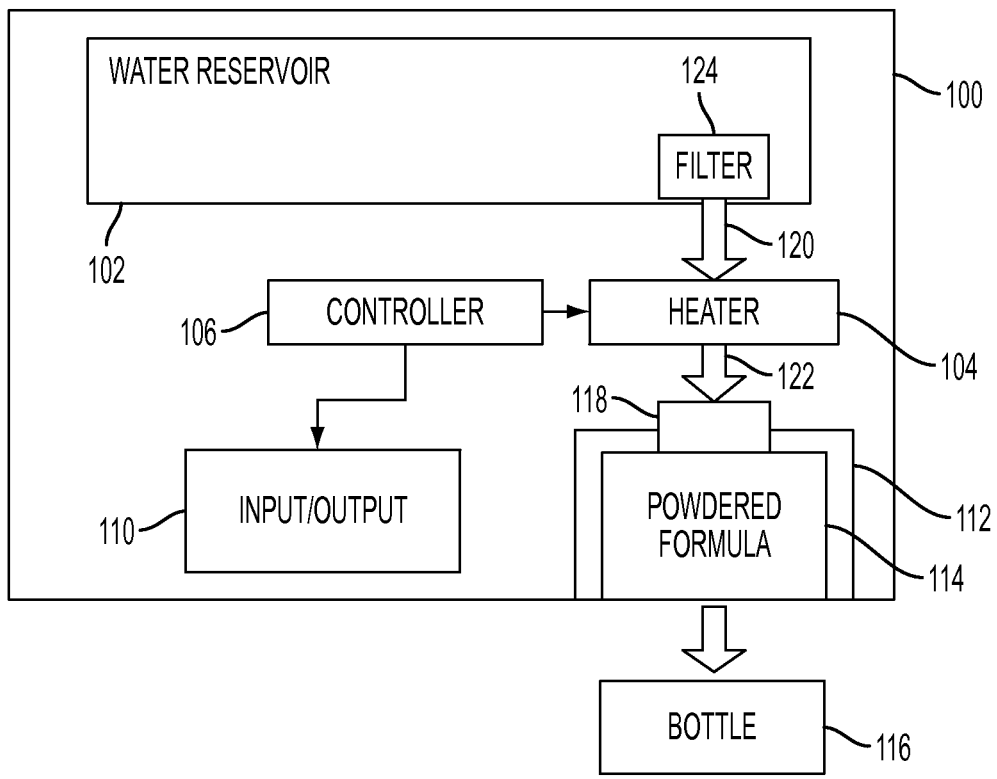
FIG. 2 is a schematic illustration of an alternate embodiment of an infant formula preparation apparatus.
Figure 3A:
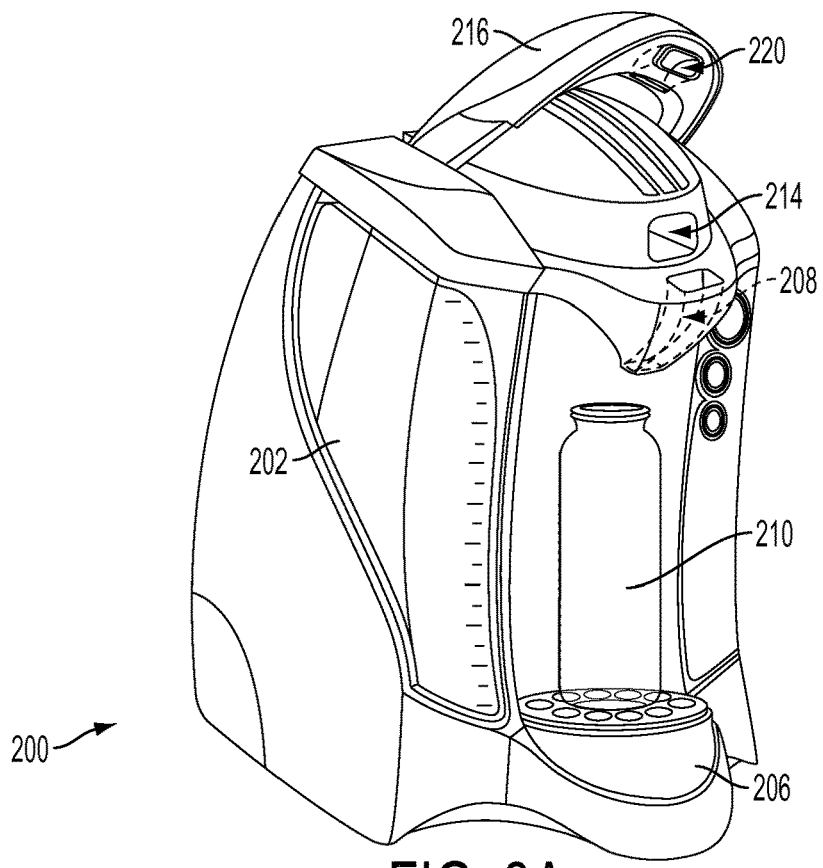
FIG. 3A is a perspective view of an example of an apparatus for preparing infant formula powder.
Figure 3B:
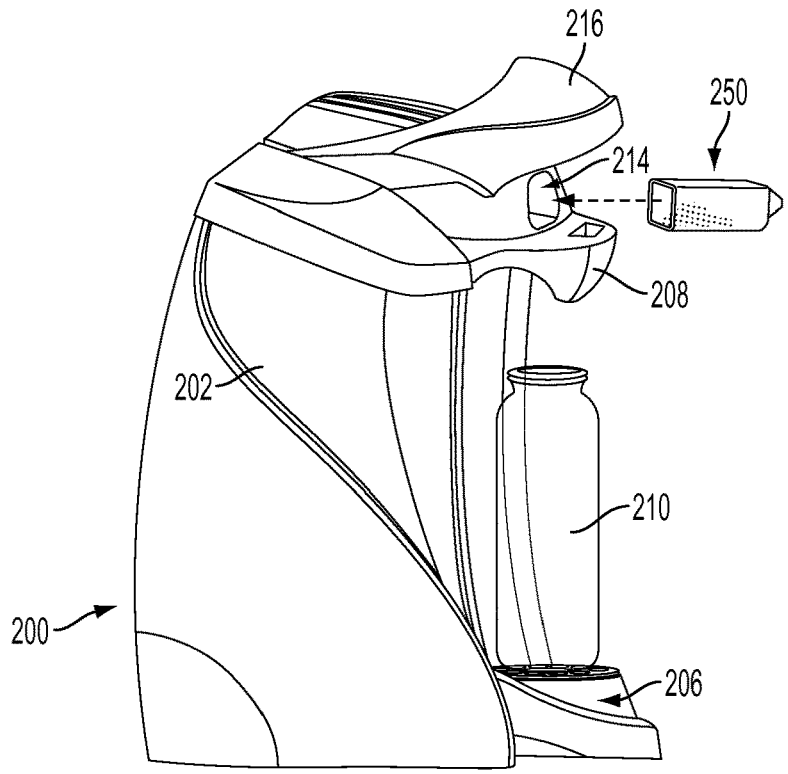
FIG. 3B is a side view of the apparatus of FIG. 3A together with a pod containing infant powder positioned for insertion.
Figure 3C:
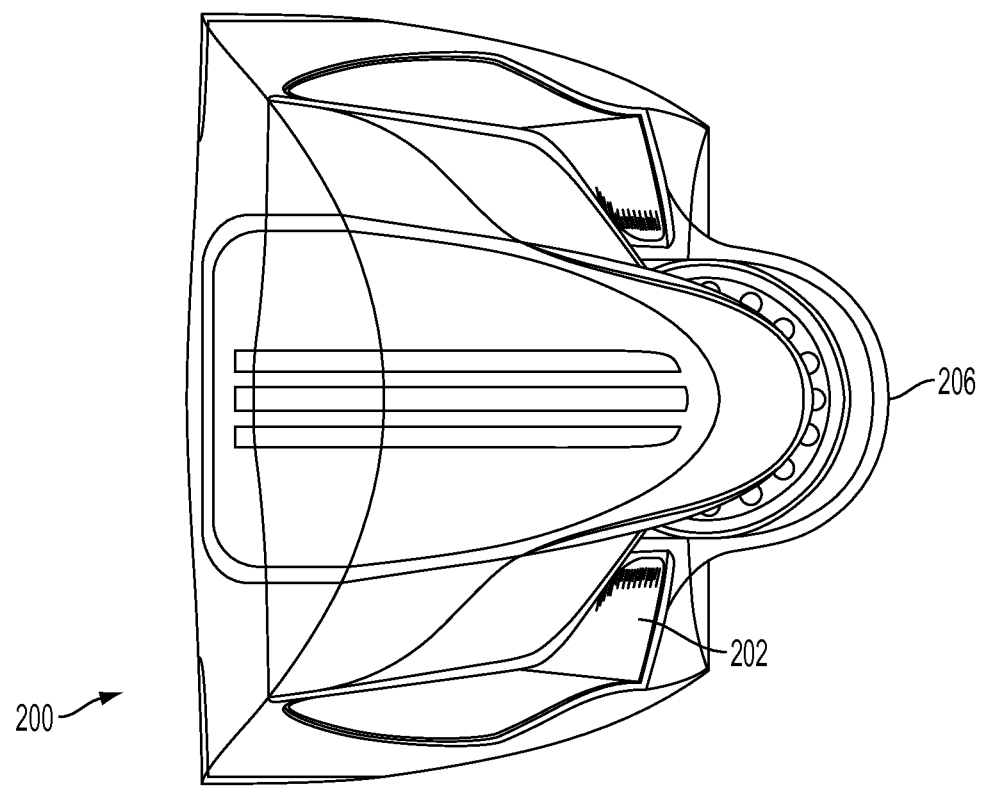
FIG. 3C is a top view of the apparatus of FIG. 3A with a compartment or receptacle for receiving a pod closed.
Figure 3D:
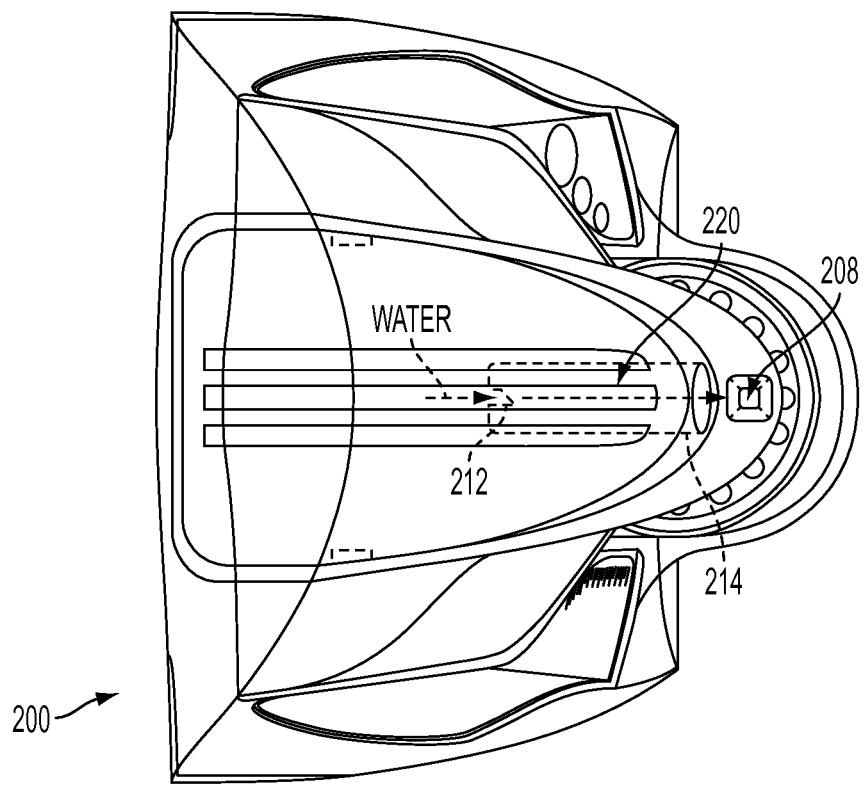
FIG. 3D is a top view of the apparatus of FIG. 3A.
Figure 3E:
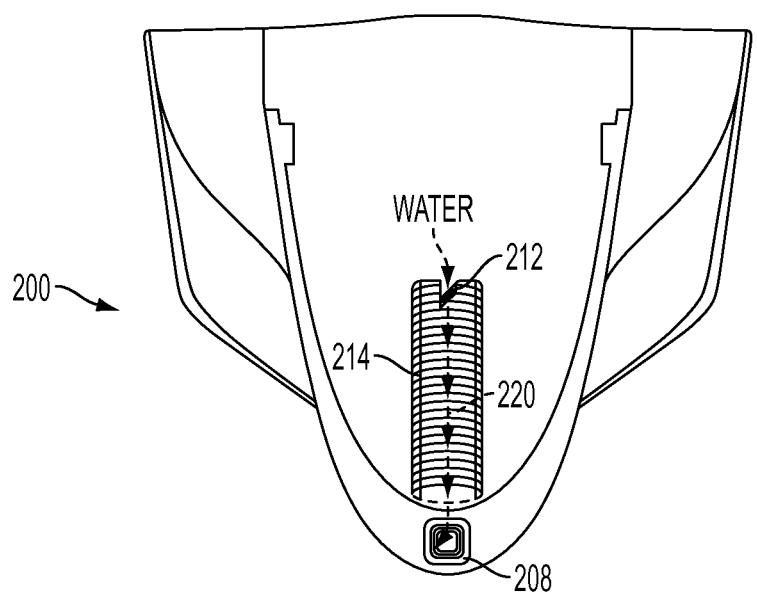
FIG. 3E is a top, sectional view of the apparatus of FIG. 3A.

FIG. 2 illustrates an alternate embodiment in which the heating element 104 heats water as it flows through a line (e.g. hose or tubing) along the water path from reservoir 102 to coupling 118. The amount of thermal energy transferred by the heater to the water during dispensing water from the water reservoir into a container such as bottle 116 is preferably sufficient to raise the temperature of the volume of water being dispensed into the bottle 116 to a desired temperature or within a range of desirable temperatures acceptable for ingestion by an infant. Filter 124 can be placed between an outlet (not illustrated) of water reservoir 102 and the heating element 104, or it may be placed in the water flow after the heating element 104 and before coupling 118.

Although not indicated in FIG. 1 or FIG. 2, gravity or a pump may be used to feed water from water reservoir 102 to coupling 118. If a filter is utilized, it is preferable for a pump to be used to pump water from the water reservoir through lines to the coupling 118 in order to overcome the resistance of filter 124. Furthermore, if an inline heater 104, as shown in FIG. 2, is utilized, it is preferable to utilize a pump to transfer water from the water reservoir at a relative constant pressure and flow rate toward the coupling 118 in order to ensure predictable heat transfer from the heater to the water. A pump is also preferred to force water under pressure into the pod to promote turbulence.

Although not indicated on the drawings, the apparatus may include a mechanism for rotating and/or shaking (including vibrating) the pod before, during and/or after water is injected into the pod in order to loosen the powdered infant formula, induce greater turbulence during injection of the hot water, encourage mixing after water injection stops and the water and formula mixture exits the pod. Doing so will tend to lessen the risk of clumps forming and will help ensure that most of the formula exits the pods. The pod and/or apparatus may also comprise a mechanism for stirring the mixture within the pod, or otherwise introducing turbulence into the flow of water and the resulting solution within the pod and/or during discharge from the pod.

During operation of the apparatus of FIG. 1 or of FIG. 2, controller 100, or some other controller not shown, causes a predetermined amount of water to flow from the reservoir and into and through the pod, the predetermined amount being the correct amount for preparing formula from the amount of powder or liquid concentrate in the pod. The apparatus may be configured for use with pods with different amounts of powder for differently sized feeding amounts. The apparatus would include an input, for example a switch, that enables a user to select a feeding size. The pod preferably includes an indicator of the amount of powder or feeding size that can be detected by a reader in the apparatus. The indication may be physical, for example, the presence or absence of a physical element, or the size, shape or other characteristics of the pod, which can be detected with a switch or other mechanical actuator. It may also be electrical, magnetic, or visual, in each case read by an appropriate detector. The controller is also preferably adapted for preventing delivery of water if the water exceeds the set point and/or a maximum temperature by a predetermined amount.

Referring generally to FIGS. 3A-3F, an example of an infant formula dispensing apparatus 200 has a water reservoir 202. In this example, the reservoir is removable and is preferably made from BPA-free plastic. Although not required, it is preferred that the apparatus include a platform 206 disposed in a lower portion extending from the apparatus, and situated directly beneath a spout 208 through which infant formula flows. A suitable receptacle, such as a lidless infant bottle 210, receives the infant formula when the receptacle is placed upright on the platform and the infant formula is caused to flow through the spout 208.

Figure 4:
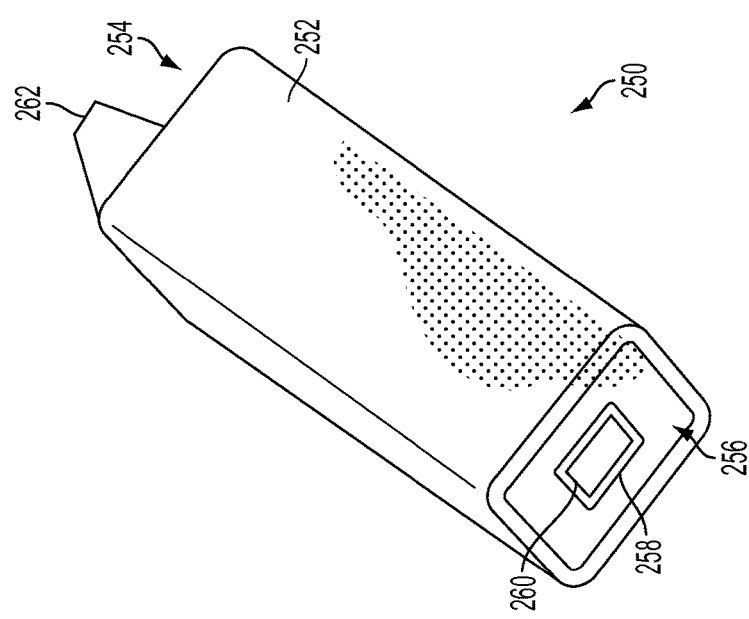
FIG. 4 is a perspective view of an example of a pod containing powdered infant formula for mixing with water to prepare a single serving of infant formula.

Referring now also to FIG. 4, an example of one embodiment of a pod 250 is comprised of infant formula powder or liquid concentrate enclosed in a container 252. The container is made of plastic, glass, or any other material or combination of materials capable of providing protection of the powdered formula inside the pod against undesirable infiltration of water and contaminants in environments in which the pod is expected to be stored. It can be a flexible or rigid material, or a combination of such materials. It can take the form of a cartridge, a packet, or any other type of container.

The pod is preferably filled with infant formula in either powdered or liquid concentrate, and sealed prior to distribution to a caregiver, and is disposable after a single use. The amount of infant formula within a pod is preferably sufficient for preparing one feeding of a predetermined size.

The exemplary pod 250 further comprises ends 254 and 256. A coupling end portion 258 is configured to engage a cooperating element or fixture of the apparatus and receive a flow of water. A cooperating fitting on the apparatus and the end portion 258 form a coupling for delivery of water to the pod. The end portion 258 that couples with the fixture may include, for example, an opening surrounded by a lip 260 or raised portion that, when coupled to the fixture of the apparatus, establishes at least a partially sealed coupling for transfer of water without substantial leakage. In one example, the cooperating fitting on the apparatus is comprised of a tube 212 (FIGS. 3D and 3E) which punctures the end of the container when the pod is inserted into a receptacle, such as chamber or compartment 214 that is formed within apparatus 200. Water flows from the tube and into the pod, and at least begins to mix with the powdered infant formula to form a solution that then exits through a discharge opening formed at the opposite end by extension 258 being snipped, the solution preferably carrying any unmixed powdered infant formula with it. The lip 260 of coupling portion of the pod 262 preferably cooperates with the fixture or other surfaces disposed within the chamber 214 to form a seal that tends to prevent water and formula from leaking into the chamber.

Turning back now to FIGS. 3A-3E and referring generally thereto, the apparatus 200 has a lever 216 mounted to operate between at least two positions. When in a raised position, it reveals an opening into receptacle or chamber 218 for receiving the pod 250. A passage 220 formed within the lever 268 directs flow of water from the pod to the spout 258 when the lever 268 is in a lowered position.

The pod is inserted into the chamber and the lever is lowered into place, pushing the pod snugly into the cavity to form a seal at each end of the pod and causing the fixture to open the end of the pod, such as by puncturing or cutting a wall of the container forming the pod, or a seal overlaying an opening formed in the wall or other element of the container. The lowering of the lever can also, if desired, be used to operate a mechanism that cuts, punctures or otherwise the other end of the pod to form openings through which water flows into, and from which water and formula (either still mostly in powdered form or mostly mixed with the water) flows out. Once the end of the pod is pierced and water flows into and through the pod in a water flow direction 220 that is opposite the insertion direction. The chamber 214 is sized and shaped to snugly receive the pod, and its inner walls assist in supporting the container and preventing rupture of the container by water pressure. The water flow assumes a new direction in the spout 208, which is an infant formula flow direction downward into the bottle 210 placed upright on the platform 206. The apparatus may further include a mechanism for selectively applying pressure to different portions of the walls of the container (which can be flexible), to induce with the container a mixing action or to force discharge of any residual contents of the container of the of the pod.

Figure 5:
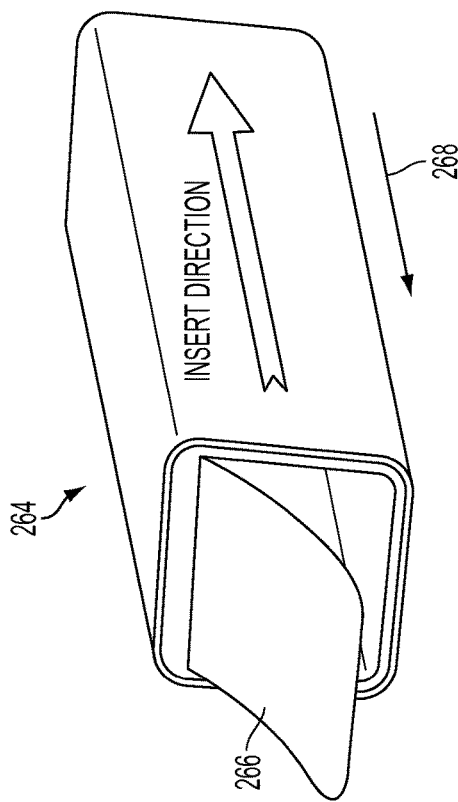
FIG. 5 is another example of a pod.

FIG. 5 is a diagram of another example of an infant formula pod 264. After the pod 264 is inserted into the apparatus 200 and the lever is lowered, a cutting blade is either automatically or manually activated to open the pod on the downstream end of the pod. In one example, the cutting blade cuts through foil or foil-like material along the left, right and lower edges of the front end of the pod. The top edge of the foil will remain uncut, thus leaving a flap 266 attached to the pod 264. This flap will allow for the maximum amount of infant formula contained in the pods to exit the pod once the flow 268 of warm water enters via the back end of the pod.

Figure 6:
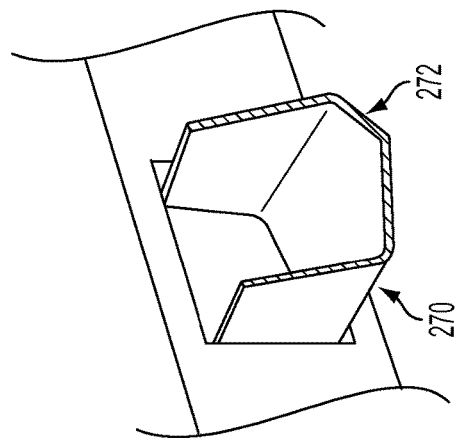
FIG. 6 is a perspective view of an exemplary cutting mechanism for opening the pod of FIG. 5.

FIG. 6 is a diagram of the cutting implement built into lever 216. Once the lever is lowered, a blade 270 made of, for example, either stainless steel or a suitable plastic, extends into the front end of the pod and then retracts. The blade 286 has a beveled edge 272 as to make it suitable for making an incision into the foil or foil-like material at the front of the pod.

Figure 7A:
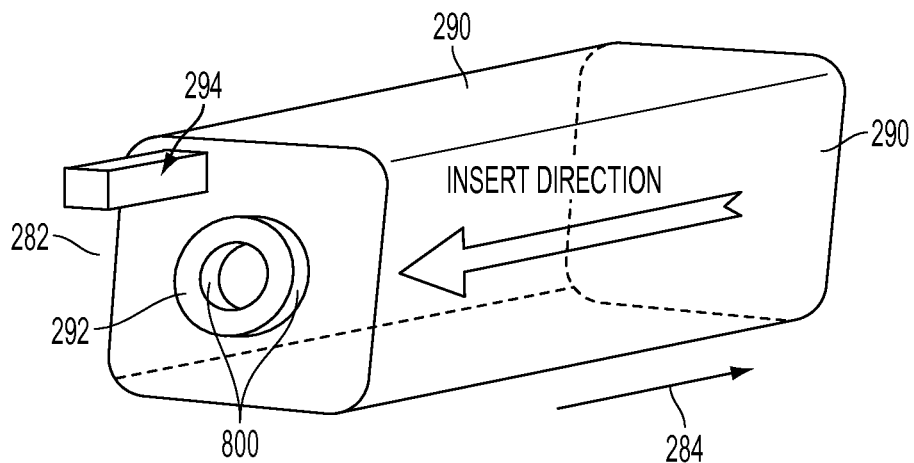
FIG. 7A is a perspective view of a "dummy pod" for use in cleaning an apparatus for preparing infant formula.
Figure 7B:
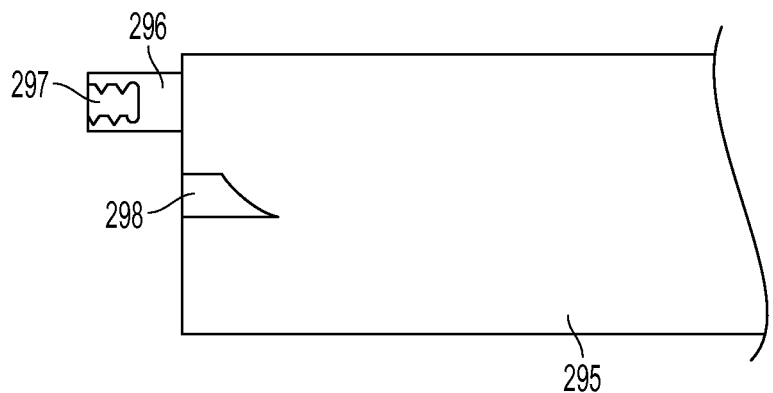
FIG. 7B is a cross-sectional view of a chamber for receiving a pod containing powdered infant formula.

FIG. 7A is a diagram of an exemplary embodiment of a "dummy pod" 290 used for cleaning mode and/or dispensing of high temperature water from the apparatus. The "dummy pod" is made, for example, of an ABS plastic or other suitable material and is of different appearance than pods containing powdered infant formula, for example bright red in color, in order to alert the user of its purpose. The "dummy pod" 290 comprises a rubber grommet 292 located in an opening at the back end of the pod to prevent seepage from where the water flows into the pod. The water flow, which is in the direction indicated by arrow 284, from the back of the pod to the front of the pod, is unobstructed. The front of the pod is open. The pod is formed to include a protrusion 294 from the back end. A purpose of the protrusion 294 is to activate a safety switch 297 located at the rear of the pod insertion chamber 295, shown in FIG. 7B. When this safety switch is activated, the apparatus will dispense high temperature water.

Figure 8A:
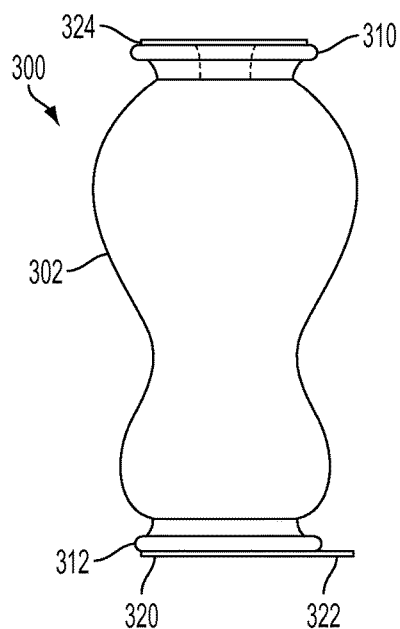
FIG. 8A is a side view of another example of a pod.
Figure 8B:
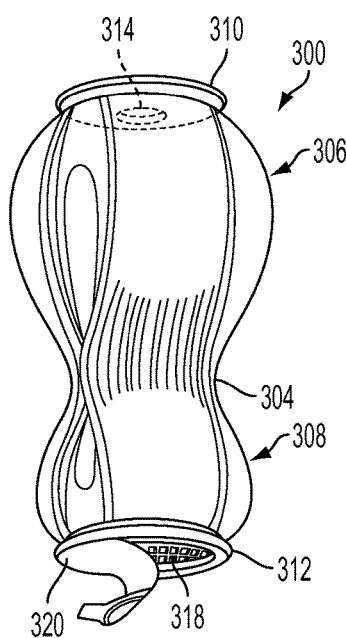
FIG. 8B is a perspective view of the example of pod of FIG. 8A.
Figure 8C:
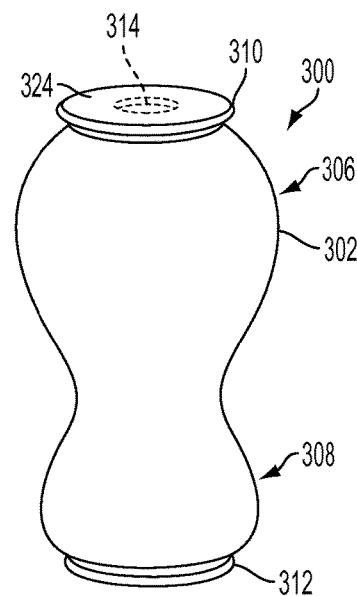
FIG. 8C is another perspective view of the pod of FIG. 8A.

FIG. 8A is an illustration of the rear of a pod chamber 295 formed within an infant formula preparation apparatus, such as those of FIGS. 1, 2 and 3A-3F. Located at the rear of a pod chamber 295, is a syringe-like spout or tube 298 made of either stainless steel or a suitable plastic, and an opening 296 located for receiving the protrusion located at the back of the dummy pod 290 (FIG. 7A) when the pod is inserted into the chamber. Inside the opening is disposed, for example, a push-to-activate style switch 297 enclosed in a rubber boot. Only when the dummy pod is inserted into the pod chamber and the safety switch is held in the activate position will the apparatus be able to dispense high temperature water for purposes of cleaning the apparatus.

In yet another example of an apparatus for preparing infant formula, a pod is inserted into or mounted on the apparatus in a manner whereby the pod is opened by the apparatus and powdered infant formula within the pod is dispensed directly into a receptacle, such as an infant bottle without first being mixed with water. Water at a temperature acceptable for ingestion by an infant then flows into the bottle. The apparatus optionally includes a mechanism for pushing the formula from the pod. However, gravity could also be used to cause the powder to fall into the bottle, in which case the pod would be shaped or oriented so that a bottom wall is removed during or after insertion to allow the contents to fall into the bottle. A guiding structure may be utilized to funnel the powdered infant formula or liquid concentrate. Alternatively, a mechanism for pushing the powder from the pod could be used to break a cover of an opening in the pod, or a designated wall of the pod, through application of force to the powder inside the port.

In another alternative example, water flows through or around the pod after the powder is dispensed, and down a common or shared spout or funnel, into the bottle.

Each of the examples of an apparatus for preparing infant formula disclosed herein may, if desired, incorporate flow of water and mechanisms for breaking seals on the pod or for cutting openings, and may be automatic or semi-automatic, the mechanisms being activated in response to, for example, insertion of the pod, depressing of a button or pulling of a lever. The mechanisms could be powered by a motor or by manually applied force. Other methods and structures could also be employed for automatically or semi-automatically opening the pod for dispensing powder into the bottle and causing water to be dispensed.

It should be understood that any of the apparatus for preparing infant formula disclosed can be configured with a nozzle to spray water under pressure and/or with turbulence into the pod so as to agitate the infant formula powder and facilitate mixture of the powder with the water. Further, any of the apparatus for preparing infant formula may be configured for physically vibrating, shaking or moving the container—such as by moving a structure supporting the pod—on order to encourage mixing and/or discharge of the powdered formula from a pod.

Referring to FIGS. 8A-8F, an alternate embodiment of a packet-like pod 300 containing infant formula in a powdered form is comprised of a bag portion 302. The bag portion is comprised of a flexible material and may be formed from single or multiple pieces. The bag portion is preferably pinched in the middle to form a seal 304 that divides the bag portion into an upper volume 306 and a lower volume 308. Opposing sides of the bag portion can be joined or bonded to form the seal in any manner known. An upper end of the bag 302 is attached to a comparatively rigid member 310, which may be comprised of plastic. The bottom end of the bag portion is attached to another comparatively rigid member 312. Each of these members close the top and bottom openings of the bag. The top member 310 includes an opening 314 for cooperating with, for example, a rigid or relatively stiff tube 316 for delivering water to the pod. During manufacture, the upper volume 306 is filled with powdered infant formula in an amount sufficient for a single feeding of a predetermined size. The lower volume 308 is preferably empty. Lower member 312 comprises grating 318. During manufacture, a removable cover 320 is placed over the lower member 312 to cover grating 318 to prevent foreign particles and contaminants from entering the lower volume 308. Removable cover 320 incorporates a tab 322 for facilitating manual removal of the cover prior to use of the pod. Top member 310 is sealed using a cover 324 that is preferably not easily manually removed in order to discourage tampering of the pod prior to use. At least the peripheral top and lower members are preferably made to be relatively stiff (but not necessarily inflexible) so that the pod may be more easily retained within an apparatus for preparing infant formula. However, the grating of the lower portion can be made from a relatively course netting or web.

Figure 8D:
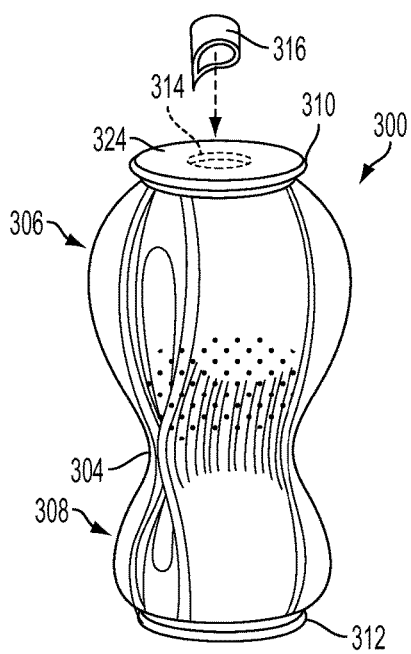
FIG. 8D is an perspective view of the pod of FIG. 8A immediately prior to insertion into an apparatus for preparing infant formula.
Figure 8E:
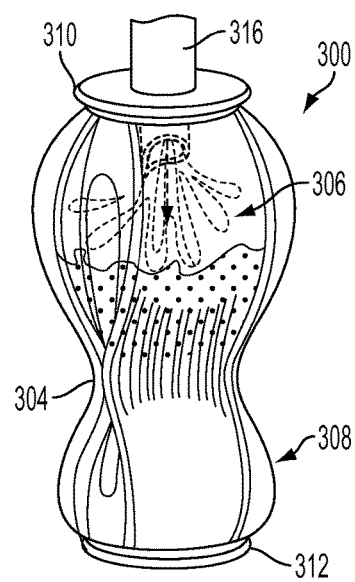
FIG. 8E is a perspective view of the pod of FIG. 8A coupled with the apparatus to receive water.
Figure 8F:
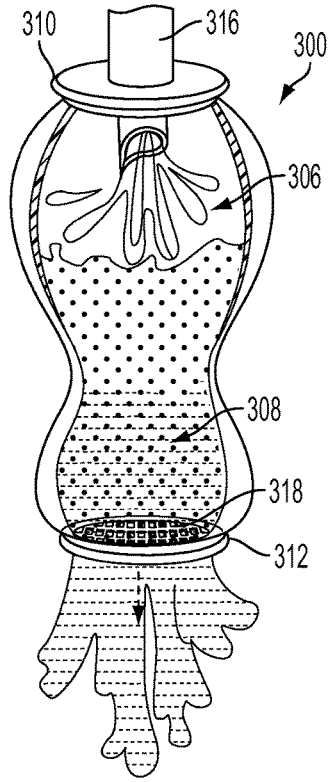
FIG. 8F is a partially sectional, perspective view of the pod of FIG. 8A during dispensing.

As illustrated by FIGS. 8D-8F, when the pod is placed in an apparatus for preparing infant formula as described herein, the pod is brought into contact with a coupling element or fitting which comprises, in this example, tube 315 for delivery of water. Tube 315 punctures the cover 324 when either the tube is lowered toward the pod, or the pod is moved toward the tube. Prior to placement of the pod within the apparatus, seal 320, which prevents contamination or foreign particles from entering lower volume 308 of the pod, is removed. As shown in FIG. 8E, water is then delivered into the upper volume 306 of the pod, which contains the powdered infant formula. Preferably, the water is delivered under force, which causes turbulence and agitates the powdered infant formula within the upper volume 306. When pressure builds within the upper volume 306 to levels sufficient to break the seal 304 between the upper and lower volume 306 and 308, the seal breaks and any unmixed powder and the water fall into the lower volume 308.

Grating 318 prevents large clumps of powder from falling out before having an opportunity to mix with the water and provides some back pressure to encourage further mixing of the powder with the water. The mixture of water and powder then flows through the grating 318 into a bottle or other container positioned below the pod. The grating is not intended to trap, filter or otherwise prevent the entire contents of the pod from being discharged either in a form in which it is mixed with water or in mixed powder form.

Alternately, the lower member 312, which is comprised of grating 318, can be omitted if the powdered infant formula being utilized does not tend to clump. In this alternate embodiment, seal 304 may be formed nearer the end, or at the end, of the bag portion.

Figure 9:
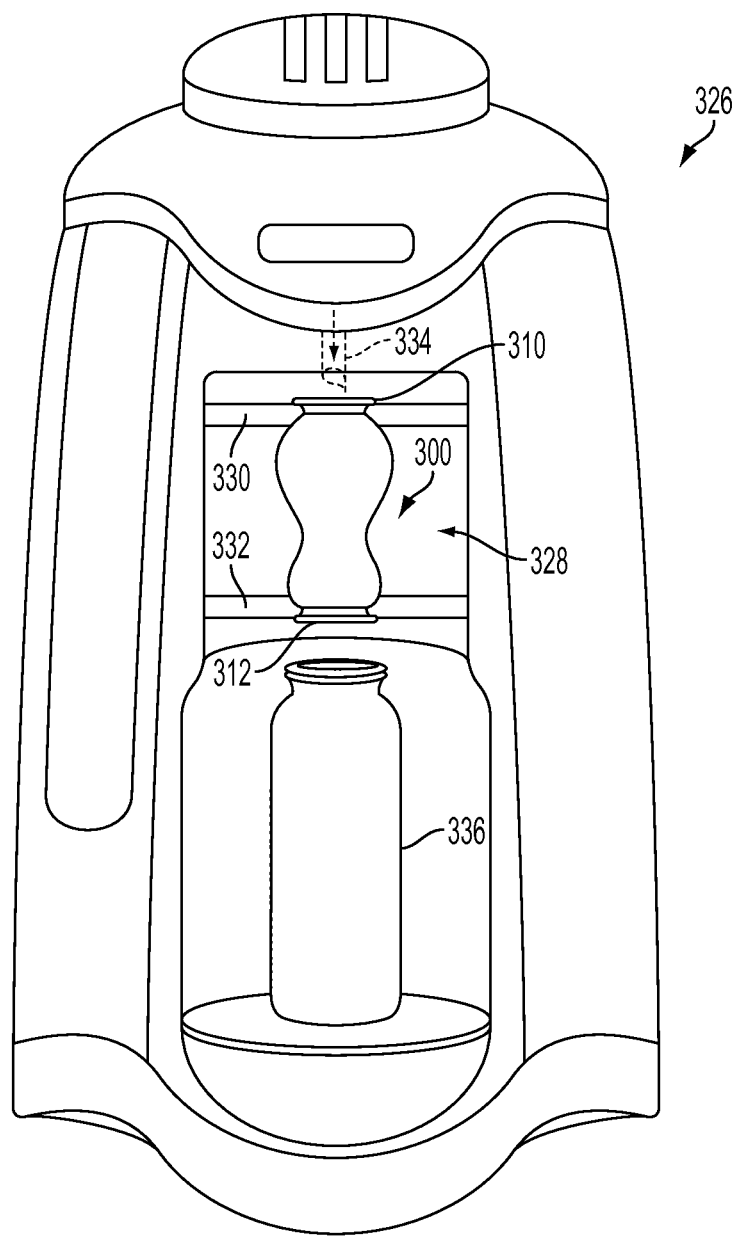
FIG. 9 is a front view of an example of an apparatus for preparing infant formula using the pod shown in FIGS. 8A-8F.

FIG. 9 illustrates an example of an apparatus for preparing infant formula utilizing a pod 300 as described in FIGS. 8A-8F. Like the apparatus 100 described in FIGS. 1 and 2 and the apparatus 200 described in FIGS. 3A-3E, apparatus 326 includes a water reservoir 327, a heater which cannot be seen, for warming water from the reservoir to a temperature within a predetermined range of temperatures suitable for feeding infant formula to infants, prior to dispensing the water into pod 300 for mixing with powdered infant formula contained within the pod. In this example, an opening or compartment or chamber 328 is formed within the apparatus to receive pod 300. Inside the compartment is a frame comprising a structural element 334 cooperating with the top 310 of pod 300 to hold the pod 300 in a vertical orientation as shown in the drawing. Bottom support element 332 cooperates with the bottom element 312. The bottom support element may not be necessary in some applications. It provides additional support and maintains the pod in the correct orientation.

Support elements 330 and 332 which comprise a frame for supporting pod 300 can be fixed or can be optionally mounted within the apparatus using any suitable means that permits it to be moved up and down and, if desired, side to side. Movement of the pod 300 up and down allows it to be moved up towards engagement with water supply 334 to form a coupling for transfer of water into the pod from the apparatus. Movement of the pod towards apparatus 300 may be accomplished using a motor, which is actuated using buttons or some other mechanism for indicating that the pod has been placed within the frame and the caregiver is ready for infant formula to be prepared.

The frame may also be moved to raise the pod 300 into a coupling position with tube 334 by the caregiver moving a lever, for example, a lever connected to a door (not shown) that closes across the opening of compartment 328. Alternately, if the frame supporting pod 300 remains in a fixed position with respect to the apparatus, tube 334 is lowered for coupling with the pod 300 as shown in FIGS. 8A-8F. Movement of the tube 334 may, like movement of the frame supporting pod 300, be powered by a motor or by actuation by a caregiver of a lever connected to, for example, a cover or door for compartment 328.

Optionally, by supporting or retaining the pod 300 within a frame capable of movement up and down and/or sideways, the pod 300 may be vibrated, shaken or moved up and down and/or sideways after it disengages from tube 234 in order to encourage mixing of any remaining water and powder within the pod and to encourage any remaining mixture to dislodge and fall through the grating 318. If the rigid tube 234 is mounted to the frame, with a flexible hose supplying it with water, the tube may remain inserted in the pod during movement of the frame, thus allowing shaking (including vibrating) of the pod to take place during delivery of water.

Alternately, or in addition thereto, the frame supporting the pod 300 within the apparatus may further include a rotational mechanism for imparting rotation to the pod 300 while it is in the frame, again to encourage mixing and dislodgement of any remaining infant powder within the pod 300.

Furthermore, the process may be altered by, for example, shaking or vibrating pod 300 before delivery of water by moving the frame and/or the pod within the frame, in order to encourage powder to fall from the pod into a bottle 336 prior to coupling of the pod 300 with tube 334. Delivering water to the pod 300 after at least some of the powdered infant formula falls out of the pod into bottle 336 enables the water to mix more easily within the pod 300 and to ensure that all of the powdered infant formula is washed from the pod into the bottle. The caregiver may finish mixing the powdered infant formula with the water by shaking the bottle 336 after the top has been placed on it, thereby resulting in complete incorporation of the powdered infant formula into the water.

The foregoing description is of an exemplary and preferred embodiments employing at least in part certain teachings of the invention. The invention, as defined by the appended claims, is not limited to the described embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated structures or the disclosed embodiments.

What is claimed is:

1. A prepackaged pod of infant formula for using in preparing a single infant feeding of predetermined size, comprising:
  a bag having an opening on a bottom end;
  a predetermined amount of infant formula powder within the container sufficient for preparing a single infant feeding of a predetermined size; and
  a seal, breakable under pressure of water delivered by an apparatus for preparing infant formula, formed by bonding opposing sides of the bag above the opening for preventing the infant formula from falling through the opening, the opening not being sealed;
  wherein the bag is configured to be received within a chamber of the apparatus for preparing infant formula, and
  wherein the pod comprises a top member for coupling with a fixture within the chamber for receiving of a predetermined amount water from the apparatus for preparing infant formula for mixing with the infant formula powder, the pod configured for discharging the mixture of the water and the entire amount of infant formula from the bag, without trapping, filtering, or preventing the mixture of water and infant formula from discharging from the bag, upon breaking of the seal by the pressure generated by the water,
  wherein the seal is located between the top member and the opening in the bottom end; and
  wherein the pod further comprises a grating with a removable cover disposed within the opening in the bottom end to discourage discharge of unmixed clumps of infant formula without preventing discharging of the entire amount of infant formula from the bag without trapping, filtering, or preventing the mixture of water and infant formula from discharging from the bag, wherein the seal is formed between the top member and the grating.

2. A method of preparing infant formula for immediate feeding to an infant using an apparatus comprising a reservoir and a heater for warming the water, comprising:

storing water in the reservoir of the apparatus;

heating water from the reservoir;

receiving into a chamber within the apparatus a prepackaged pod comprised of a bag containing infant formula in a powdered form, the bag having an opening at one end, a grating within the opening, a top member for coupling the pod to a supply of water, and a seal formed by bonding opposing sides of the bag between the top member and the grating to trap the infant formula between the top member and the seal, thereby preventing the infant formula from exiting the bag until the seal is broken;

coupling the pod for delivery of water to the pod from the reservoir;

delivering of water to the pod in an amount sufficient to prepare the one feeding of predetermined size; and causing breakage of the seal to discharge the mixture of the predetermined amount of water and all of the infant formula from the bag.

* * * * *